United States Patent [19]

Deibel

[11] Patent Number: 5,118,417

[45] Date of Patent: * Jun. 2, 1992

[54] HIGH-STRENGTH DISPOSABLE TUBE FILTER

[76] Inventor: Richard J. Deibel, 501 Pine St., Bamberg, S.C. 29003

[*] Notice: The portion of the term of this patent subsequent to Jun. 18, 2008 has been disclaimed.

[21] Appl. No.: 470,520

[22] Filed: Jan. 25, 1990

[51] Int. Cl.$^5$ .............................................. B01D 27/08
[52] U.S. Cl. .................... 210/232; 210/441; 210/446; 210/454; 55/510
[58] Field of Search ............... 210/440, 443, 450, 452, 210/416.4, 416.5, 232, 441, 446, 447, 454, 130, 497.01, 497.1, DIG. 17; 55/447, 490, 492, 508, 510

[56] References Cited

U.S. PATENT DOCUMENTS

| | | | |
|---|---|---|---|
| 4,369,113 | 1/1983 | Stifelman | 210/DIG. 17 |
| 4,743,374 | 5/1988 | Stifelman | 210/440 |
| 4,834,885 | 5/1989 | Misgen et al. | 210/450 |

*Primary Examiner*—Robert A. Dawson
*Assistant Examiner*—Wanda L. Millard

[57] ABSTRACT

A high-strength disposable tube filter and associated mounting and fluid distribution head assembly with improved fatigue life and higher operating pressure capability. The tubular style filter housing being of a unitary construction utilizes metal tubing rather than the commonly used deep-drawn thin gauge malleable metal can having the closed end of the internal filtering element being the closed structural endcap, or cover, of the housing can. The specification discloses a new state of the art unitary construction method whereas major improvements over prior art will benefit the industry.

5 Claims, 2 Drawing Sheets

HIGH-STRENGTH DISPOSABLE TUBE FILTER

CROSS REFERENCE TO RELATED APPLICATIONS

Inventions: High-Strength Quick-Disconnect Tube Filter—"Dei-Quik"; High-Strength Spin-On Tube Filter—"Dei-Max", Inventor: Richard Jefferson Deibel—United States citizen Date Filed: Jan. 22, 1990

RELATIONSHIP OF INVENTIONS

Three applications by Deibel, dated Jan. 22, 1990, are for separately and individually unique tube filter products. Each invention incorporates a new state of the art unitary tube filter housing constructed in a configuration applicable to specifically defined markets and applications.

TECHNICAL FIELD

The present tube filter invention relates generally to twist-on, spin-on, type disposable filtering devices. Particularly, this invention is a state of the art high-strength disposable filter housing constructed by welding the portion of a metal tube folded over the peripheral lip of a structural metal endcap to form a cylindrical can style filter housing. Furthermore, this invention utilizes a common metal endcap for the closed structural end of the housing and for the closed endcap of the internal filter element.

BACKGROUND ART

Twist-on, spin-on, disposable type filters are used in numerous liquid and pneumatic applications throughout the agricultural, mobile, commercial and industrial market places. Prior art twist-on disposable filter products are manufactured using a thin gauge metal can, or housing, made by the deep-draw forming of malleable metals. This technique limits the structural capabilities of current twist-on, spin-on, type products to the production capabilities of the metal forming industry and to the molecular characteristics of a limited number of specific malleable metals. Prior art uses a stamped steel or cast cover plate to secure the can to a mounting and distribution head assembly. This plate typically having a threaded center hole is spot welded and/or crimp sealed to a deep-drawn can. These techniques for sealing and connecting the can to the plate, plus the structural limits of thin gauge malleable metals, generally restrict the applicational uses of prior art twist-on, spin-on disposable filters. Some new high pressure, high-strength, disposable filter housings with burst pressure ratings in the 1,000 psi range have been developed for some narrowly defined markets and applications. However, even these newer high-strength filters remain applicationally limited because of their continued use of deep-drawn metal cans.

Another typical design common to prior art twist-on, spin-on, type disposable filters is the necessity of installing a separate filter element as well as various separator devices, in a housing can. A separate and segregated internal filter element cartridges is subject to different cyclical operational loads than those experienced by the filter housing. Current internal filter cartridge designs do not properly protect against seal distortion and wear deterioration caused by applicational flow dynamics and vibration. Such seal distortion and wear deterioration lessens a filters contamination removal efficiency by allowing contaminated fluid to by-pass the filter medium.

Examples of prior art limitations can be found in U.S. Pat. No. 4,719,012 and more recently U.S. Pat. No. 4,743,374 issued as an improvement over earlier U.S. Pat. No. 4,369,113. Each of these designs incorporates the continued use of deep-drawn thin gauge metal can having a separate and segregated internal filter cartridge. Burst pressure ratings are in the 1,000 psi range with rated fatigue pressure in the 500 psi range. These prior art pressure limitations continue to leave a major product void in the high-strength twist-on disposable filter market.

Thus, a need exists for a structurally improved twist-on, spin-on, type disposable filter with higher pressure capability, a better fatigue rating, one that eliminates the need for a segregated internal filter cartridge, and a filter product that decreases by-passing fluid losses caused by distorted or deteriorated internal filter seals. The present tube filter invention is designed to overcome one or more of the problems as set forth above.

SUMMARY OF INVENTION

The present high-strength twist-on style disposable filter with associated head invention is a new and unique product design which overcomes the foregoing limitations associated with the prior art. The filter housing and internal filter element cartridge utilize and share a common endcap to form a single unitary design that provides a rigid bonded support system within the invention thus eliminating the need for springs, spacers, pressure equalization passages, or a separate segregated filter element. The use of various gauges of metal tubing for structural integrety can permit higher operating pressures and expanded applicational opportunities. The present twist-on tube filter invention is a sealed unitary cylindrical metal tubular style filter having a housing comprised of a tubular can being open at one end with said open end having an external externally threaded support collar that functions as an attaching devise when engaged with the internally threaded head assembly. The closed non fluid communicating end of the housing is constructed by folding a portion of a metal tube wall over the peripheral lip of a structural metal endcap common to the external can and the internal filtering element wherein a circumferential weld consolidates and seals the engaging components. The internal component of the invention is a unitarily constructed cylindrical solid particulate removal filtering element capable of incorporating a variety of mediums, such as, but not limited to, cellulose and micro fiberglass. The open and fluid communicating end of the internal filtering element has an o-ring seal partially encapsulated by a retaining ring having been press-fit into a metal endcap. The filtering element has a central passage provided by a perforated metal support core. The filtering element core and medium are secured and sealed by adhesive materials potted, or installed, in the beforesaid open endcap and the structural closed endcap of the housing. The open end of the filter housing has an externally threaded support collar attached to the metal tube by flaring the open end portion of the can and circumferentially welding it securely. The externally threaded collar mates to the internally threaded mounting and fluid distribution head assembly by rotating the filter housing until tight. An o-ring seal is permanently positioned in the head assembly whereby it properly engages and seals the mating components. An open passage in a protruding connector post extending from the center of the receiving area in the head assembly provides a communicating fluid conduit and sealing seat for the internal filter element o-ring. The mounting and fluid distribution head assembly has threaded inlet and outlet fluid passage ports in addition to provisional facing areas for industry standard mounting holes and a multi-port manifold unit.

BRIEF DESCRIPTION OF DRAWINGS

A better understanding of the invention can be had by reference to the following Detailed Description in conjunction with the accompanying Drawings, wherein.

Sheet 1 of 2.

Sheet 2 of 2.

DETAILED DESCRIPTION

Figure 1:
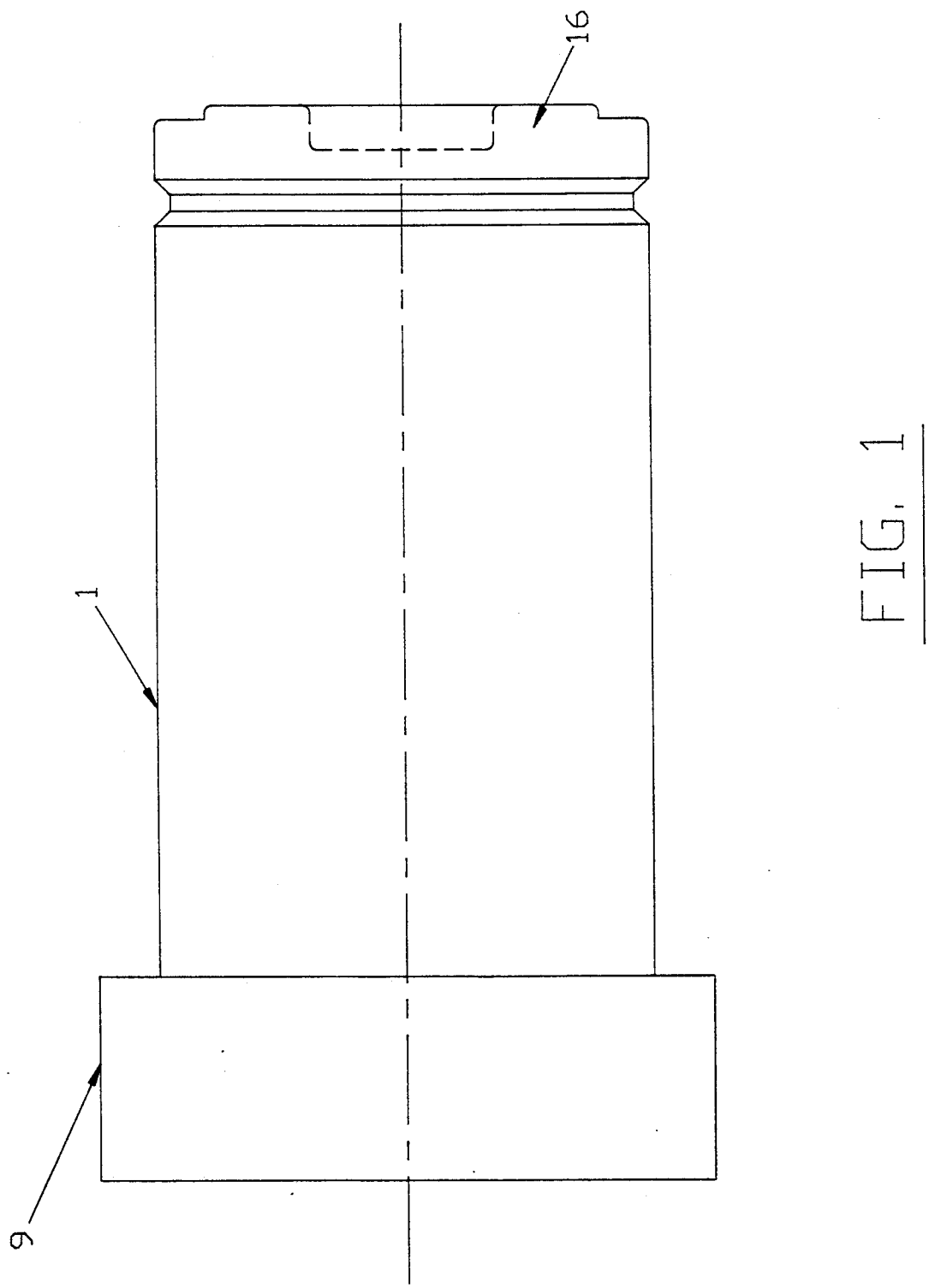
FIG. 1 is a view of an embodiment of the present invention.
Figure 2:
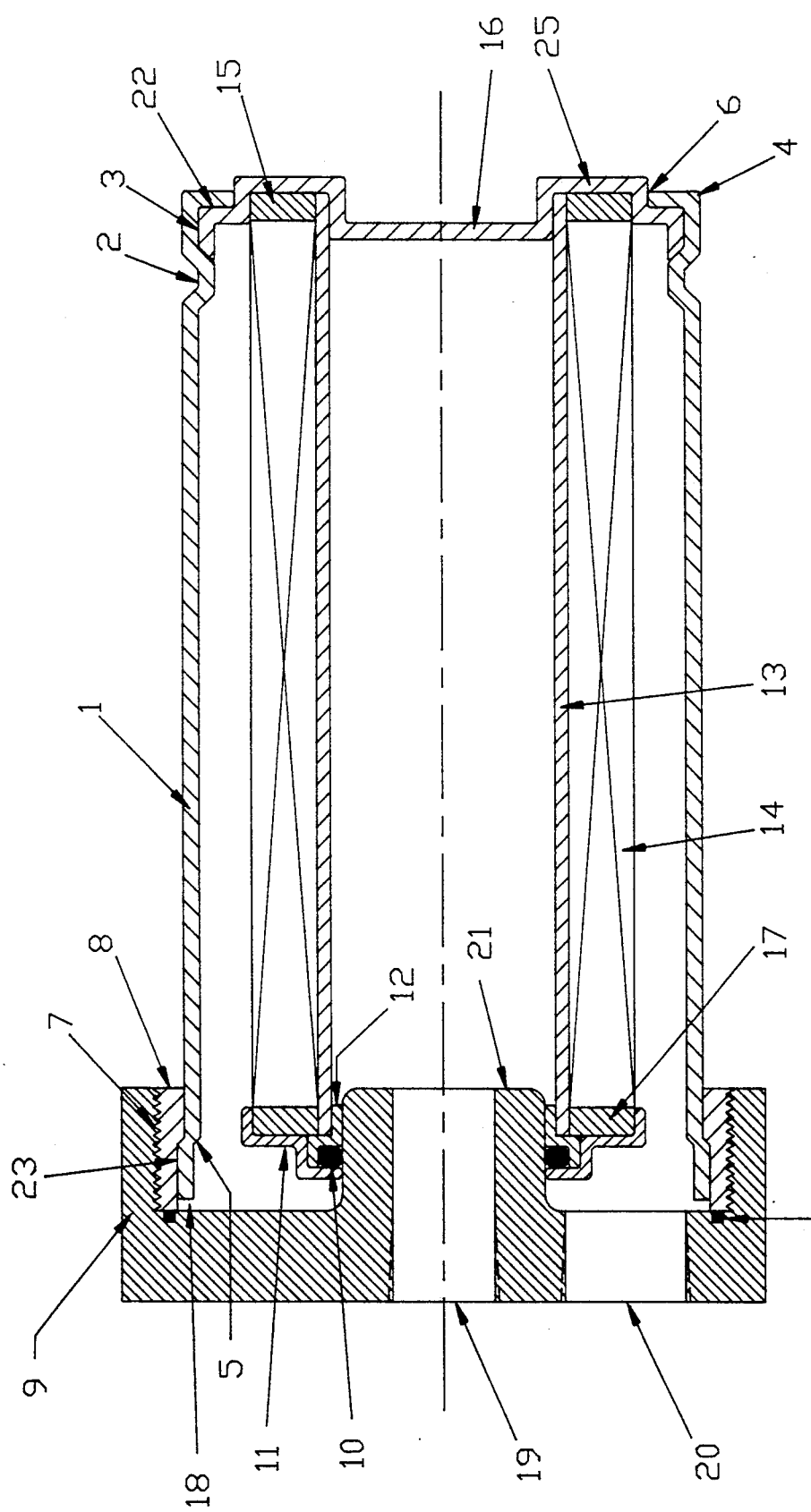
FIG. 2 is a cross-sectional view of the invention.

Referring now to the Drawings, wherein like reference numerials designate like or corresponding elements throughout the views, and particularly referring to FIGS. 1 and 2, there is shown a high-strength disposable tube filter and associated mounting and fluid distribution head assembly incorporating a first embodiment of the invention. As will be explained more fully hereinafter, the filter is particularly adaptable for the removal of solid particulates from hydraulic and lubricating oils in systems or applications operating at higher pressures. The high-strength disposable tube filter is comprised of components 1, 8, 9, 10, 11, 12, 13, 14, 15, 16, 17, 21 and 24 as particularly described in detail in the following explanation as to how each component is incorporated into a unitary constructed tube filter. Preliminary test results have confirmed the present high-strength tube filter will endure operating pressures on the order of 1,200 psi and burst pressures generally in the 3,000 psi range. Variations in desired pressure ratings are generally achievable by specifying varying gauges of metal tubing and appropriate structural endcaps. The present filter invention is descriptively referred to as a tube filter specifically because it is constructed utilizing metal tubing 1 as the main structural component of the cylindrical housing 1, 8, 16 verses a deep-drawn can know in the art. The tube 1 is generally made of metals such as cold steel, stainless steel, aluminum, or other suitable material know in the art to be capable of performing at higher pressures. This variety of readily available metal tubing permits more design flexibility with respect to envelope sizes and applicational requirements than prior art. The tube filter housing, as FIG. 1, FIG. 2, is comprised of a metal tube 1, a structural closed endcap 16 being the closed endcap for the internal filtering element, and an externally threaded support collar 8. The tube 1 may generally be from a standard variety of tube products consistent with applicational design criteria. Particularly, this invention was tested utilizes an 0.065 wall DOM unannealed steel tube. The structural endcap 16 is in a configured shape having a circumferential receptacle area 25 for engaging the support core 13, filtering medium 14, and the adhesive potting material 15 and having a flat horizontal receiving area 22 with a perimeter retaining wall 3 perpendicular to the flat area 22. The housing can is constructed by folding 4 a portion of the tube wall 1 over the peripheral lip of the structural endcap 16 into a horizontal position being on the same plane as endcap 16 receiving area 22 wherein the two components are consolidated and sealed with a weld 6 made circumferentially at the innermost point of engagement. Several types of welding technologies are applicable depending on the materials specifications of the tube 1 and endcap 16. Laser welding is preferably utilized due to weld aesthetics. An inward groove 2 formed in the tube wall 1 functions as a positioning seat for the endcap 16 and to add additional structural strength to the tube can 1, 16. Strategically placed, the inward groove 2 serves as a positioning guide and a locking groove for production fixturing during construction. This particular method of constructing a closed and sealed can 1, 16 having a dual functioning endcap is a critical feature of the present invention. This unitary method of constructing a tubular can results in several positive improvements over prior art spin-on, twist-on, filter housing designs such as; it offers a variety of material choices for improved fluid compatibility; it offers a variety of material choices for improved higher strength housings; it permits a greater variety of size variations; and among other less immediately recognizable benefits, it enlarges the scope of other less immediately recognizable benefits, it enlarges the scope of applicational opportunities not currently available to prior art.

The filter housing is of a unitary construction comprised of the aforesaid can 1, 16 and an externally threaded support collar 8. The open end of the can 1, 16 is flared outward 5 to engage the externally threaded support collar 8 internal recessed receiving area 23. A circumferential weld 18 connecting the flared top 5 of the can 1, 16 and the support collar 8 at the upper most point of engagement seals and consolidates the two components.

An internal filtering element is centrally positioned in the filter housing 1, 8, 16. The element comprises an endcap 11, 12 having a center opening with an o-ring 10 to receive a portion of the connector post 21 in the head assembly, a perforated core 13, a suitable filtering medium 14 surrounding the core 13, and an adhesive potting material 15, 17. The open end of the element is assembled in a fashion known in the art being the core 13 and medium 14 are potted utilizing adhesive 15, 17 in the endcaps 11, 12 and 16. In the present invention the endcap 16 being a structural part of the can 1, 16 is used as the closed endcap of the internal filtering element 10, 11, 12, 13, 14, 15, 16, and 17. This particular method of constructing the internal filtering element as a unitary component of the housing is a critical feature of the present invention. This unitary construction feature results in several positive improvements over prior art, such as; it eliminates the need for separator devises, springs, pressure equalization passages, or spacers; it eliminates the need for one additional internal element endcap; it stabilizes the internal element against movement caused by applicational flow variations and vibration; it extends seal life and improves seal performance by protecting the internal element against movement during operation; and among other less immediately recognizable benefits, this method improves the solid particulate removal efficiency of the filter medium by stabilizing the element.

The externally threaded support collar 8 of the disposable tube filter threadingly engages a mating internal threaded mounting and fluid distribution head assembly 9 to form a closed pressure vessel. The associated mounting and fluid distribution head assembly 9 has an internally threaded 7 recessed area for receiving the disposable tube filter, an o-ring seal 24 permanently positioned to seal the engaging tube filter, a connector post 21 for an axial fluid communicating passage between the internal filtering element and the head, a centered internally threaded outlet opening 19 in communication with the internal element through the protruding connector post 21, and an internally threaded inlet opening 20 near the outer circumference of the head assembly and inward of the flat mounting area thereby providing for an array of mounting configurations and tapping specifications. A precise mounting configuration is not critical to the practice of the invention.

From the foregoing, it will thus be apparent that the present invention comprises a high-strength disposable tube filter and head therefor capable of improved performance over prior art in a variety of applications including, but not limited to, high pressure, high-strength, quick change, and/or disposable. Additional advantages will be evident to those skilled in the art.

Although particular embodiments of the invention have been illustrated in the accompanying Drawings and described in the foregoing Detailed Description, it will be understood that the invention is not limited only to the embodiments disclosed, but is intended only to embrace any alternatives, equivalents, modifications and/or rearrangements of filters, filter housings, filter elements, or any part therof falling within the scope of the present invention as defined by the following claims.

What I claim:

1. A high pressure quick change filter device comprising a tubular metal housing having first and second ends; a first metal endcap secured to the first end of the housing by the housing being folded inwardly over the periphery of the first end cap; a tubular filter element having first and second ends disposed within the housing, said tubular filter element first end bonded to said first end cap, said tubular filter element second end comprising a second metal end cap; and a threaded head assembly sealing said second metal housing end, said threaded head assembly comprising means defining inlet and outlet openings, and said outlet opening concentrically receiving said second metal end cap.

2. The filter device of claim 1, wherein the edge of the inwardly folded housing engages said first end cap in a recessed receiving area, and is held by a circumferential weld at the innermost edge of the housing.

3. The filter device of claim 1, wherein said outlet opening of said threaded head assembly means further includes a connector post.

4. The filter device of claim 1, wherein the tubular metal housing includes a threaded support collar concentrically arranged to enhance the sealing surface between the tubular metal housing and the head assembly.

5. The filter device of any one of the claims 1–4, wherein said filter element comprises a perforated core surrounded by a suitable filtering media, and said filter element is bonded to said first end cap by a potting material.

* * * * *